(12) United States Patent
Bolbenes et al.

(10) Patent No.: US 11,461,247 B1
(45) Date of Patent: Oct. 4, 2022

(54) GRANULE PROTECTION INFORMATION COMPRESSION

(71) Applicant: Arm Limited, Cambridge (GB)

(72) Inventors: Guillaume Bolbenes, Vallauris (FR); Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/378,866

(22) Filed: Jul. 19, 2021

(51) Int. Cl.
*G06F 12/14* (2006.01)
*G06F 12/1045* (2016.01)

(52) U.S. Cl.
CPC ........ *G06F 12/145* (2013.01); *G06F 12/1054* (2013.01); *G06F 12/1063* (2013.01); *G06F 12/1441* (2013.01)

(58) Field of Classification Search
None
See application file for complete search history.

(56) References Cited

U.S. PATENT DOCUMENTS

| | | | | |
|---|---|---|---|---|
| 6,092,172 A | * | 7/2000 | Nishimoto | G06F 12/1027 |
| | | | | 711/205 |
| 2012/0072669 A1 | * | 3/2012 | Nishiguchi | G06F 12/1027 |
| | | | | 711/135 |
| 2012/0079190 A1 | * | 3/2012 | Colgrove | G06F 11/3034 |
| | | | | 711/E12.001 |
| 2016/0188486 A1 | * | 6/2016 | Sohi | G06F 12/0893 |
| | | | | 711/118 |
| 2020/0019515 A1 | * | 1/2020 | Koufaty | G06F 13/1668 |

* cited by examiner

*Primary Examiner* — Yaima Rigol
(74) *Attorney, Agent, or Firm* — Nixon & Vanderhye P.C.

(57) ABSTRACT

Address translation circuitry translates a target virtual address specified by a memory access request into a target physical address associated with a selected physical address space. Granule protection information (GPI) loading circuitry loads from a memory system at least one granule protection descriptor providing GPI indicating, for at least one granule of physical addresses, which physical address spaces is allowed access to the at least one granule. GPI compressing circuitry compresses the GPI to generate compressed GPI. A GPI cache to caches the compressed GPI. Filtering circuitry determines, on a hit in the GPI cache, whether the memory access request should be allowed to access the target physical address, based on whether the compressed GPI cached in the GPI cache for the target physical address indicates that the selected physical address space is allowed access to the target physical address. This allows more efficient caching of granule protection information.

20 Claims, 12 Drawing Sheets

| V | entry type | address tag | PAS tag | address mapping info./ compresssd GPI |
|---|---|---|---|---|
|  |  |  |  |  |
| I | TLB | VA tag | ----- | address mapping info. |
| I | GPI | PA tag | PAS tag | compressed GPI |
|  |  |  |  |  |
|  |  | ⋮ |  |  |
|  |  |  |  |  |

FIG. 12

GRANULE PROTECTION INFORMATION COMPRESSION

BACKGROUND

Technical Field

The present technique relates to the field of data processing.

Technical Background

A data processing system may have address translation circuitry to translate a virtual address of a memory access request to a physical address corresponding to a location to be accessed in a memory system.

SUMMARY

At least some examples provide an apparatus comprising: address translation circuitry to translate a target virtual address specified by a memory access request into a target physical address associated with a selected physical address space selected from among a plurality of physical address spaces; granule protection information loading circuitry to load from a memory system at least one granule protection descriptor providing granule protection information indicating, for at least one granule of physical addresses, which of the plurality of physical address spaces is allowed access to the at least one granule of physical addresses; granule protection information compressing circuitry to compress the granule protection information specified by the at least one granule protection descriptor loaded by the granule protection information loading circuitry, to generate compressed granule protection information; a granule protection information cache to cache the compressed granule protection information generated by the granule protection information compressing circuitry; and filtering circuitry to determine, on a hit in the granule protection information cache for the memory access request, whether the memory access request should be allowed to access the target physical address, based on whether the compressed granule protection information cached in the granule protection information cache for the target physical address indicates that the selected physical address space is allowed access to the target physical address.

At least some examples provide a method comprising: translating a target virtual address specified by a memory access request into a target physical address associated with a selected physical address space selected from among a plurality of physical address spaces; on a miss in a granule protection information cache for the memory access request: loading from a memory system at least one granule protection descriptor providing granule protection information indicating, for at least one granule of physical addresses, which of the plurality of physical address spaces is allowed access to the at least one granule of physical addresses; compressing the granule protection information specified by the at least one granule protection descriptor loaded from the memory system, to generate compressed granule protection information; and caching the compressed granule protection information in the granule protection information cache; and on a hit in the granule protection information cache for the memory access request, determining whether the memory access request should be allowed to access the target physical address, based on whether the compressed granule protection information cached in the granule protection information cache for the target physical address indicates that the selected physical address space is allowed access to the target physical address.

At least some examples provide a non-transitory computer-readable medium to store computer-readable code for fabrication of an apparatus comprising: address translation circuitry to translate a target virtual address specified by a memory access request into a target physical address associated with a selected physical address space selected from among a plurality of physical address spaces; granule protection information loading circuitry to load from a memory system at least one granule protection descriptor providing granule protection information indicating, for at least one granule of physical addresses, which of the plurality of physical address spaces is allowed access to the at least one granule of physical addresses; granule protection information compressing circuitry to compress the granule protection information specified by the at least one granule protection descriptor loaded by the granule protection information loading circuitry, to generate compressed granule protection information; a granule protection information cache to cache the compressed granule protection information generated by the granule protection information compressing circuitry; and filtering circuitry to determine, on a hit in the granule protection information cache for the memory access request, whether the memory access request should be allowed to access the target physical address, based on whether the compressed granule protection information cached in the granule protection information cache for the target physical address indicates that the selected physical address space is allowed access to the target physical address.

Further aspects, features and advantages of the present technique will be apparent from the following description of examples, which is to be read in conjunction with the accompanying drawings.

BRIEF DESCRIPTION OF THE DRAWINGS

FIG. 12 shows a second example of a granule protection information cache, which is a shared structure also used for caching address mapping information;

DESCRIPTION OF EXAMPLES

Figure 1:
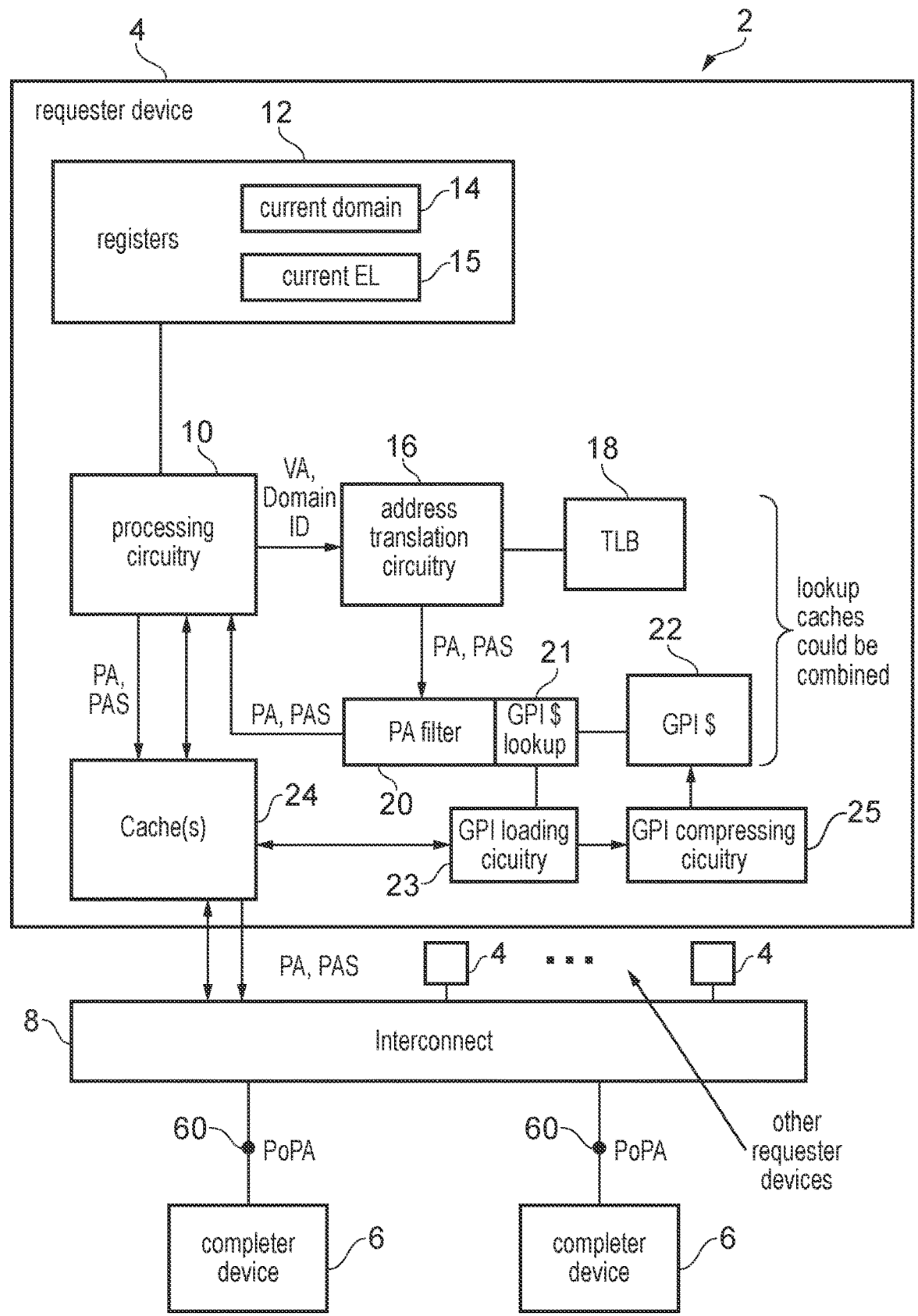
FIG. 1 illustrates an example of a data processing apparatus.

Data processing systems may support use of virtual memory, where address translation circuitry is provided to translate a virtual address specified by a memory access request into a physical address associated with a location in a memory system to be accessed. The mappings between virtual addresses and physical addresses may be defined in one or more page table structures. The page table entries within the page table structures could also define some access permission information which may control whether a given software process executing on the processing circuitry is allowed to access a particular address.

In some processing systems, all virtual addresses may be mapped by the address translation circuitry onto a single physical address space which is used by the memory system to identify locations in memory to be accessed. In such a system, control over whether a particular software process can access a particular address is provided solely based on the page table structures used to provide the virtual-to-physical address translation mappings. However, such page table structures may typically be defined by an operating system and/or a hypervisor. If the operating system or the hypervisor is compromised then this may cause a security leak where sensitive information may become accessible to an attacker.

Therefore, for some systems where there is a need for certain processes to execute securely in isolation from other processes, the system may support a number of distinct physical address spaces (PASs), which allows a further level of control over memory protection to be implemented beyond that provided by the page table structures. In some examples, for at least some components of the memory system, memory access requests whose virtual addresses are translated into physical addresses in different PASs can be treated as if they were accessing completely separate addresses in memory, even if the physical addresses in the respective PASs actually correspond to the same location in memory. By isolating accesses from different domains of operation of the processing circuitry into respective distinct PASs as viewed for some memory system components, this can provide a stronger security guarantee which does not rely on the page table permission information set by an operating system or hypervisor.

In a system in which a virtual address of a memory access request can be mapped to a physical address in one of two or more distinct PASs, granule protection information (GPI) can be used to limit which physical addresses are accessible within a particular PAS. This can be useful for ensuring that certain physical memory locations implemented in hardware either on-chip or off-chip can be restricted for access within a particular PAS or a particular subset of PASs if desired.

Hence, an apparatus may have GPI loading circuitry to load from the memory system at least one granule protection descriptor providing GPI indicating, for at least one granule of physical addresses, which of the PASs is allowed access to the at least one granule of physical addresses.

Accessing such granule protection descriptors from memory may be a relatively slow operation. For example, the granule protection descriptors may be arranged in a hierarchical table structure and so a table walk operation may be performed to locate the granule protection descriptor associated with a particular granule of physical addresses being accessed. To speed up performance, it can be useful to provide a GPI cache which can cache information derived from the granule protection descriptors loaded by the GPI loading circuitry. However, caching the GPI in its original format as defined in the granule protection descriptor may require a relatively large storage capacity in the GPI cache.

The inventors recognised that it is not necessary to cache the GPI in its original format obtained from memory. GPI compressing circuitry is provided to compress the GPI specified by the at least one granule protection descriptor loaded by the GPI loading circuitry, to generate compressed GPI. The GPI cache caches the compressed GPI generated by the GPI compressing circuitry. Filtering circuitry, provided to check whether a memory access request is allowed to access the target physical address, can use the compressed GPI in the GPI cache to determine whether the memory access request is allowed. On a hit in the GPI cache for the memory access request, the filtering circuitry determines whether the memory access request should be allowed to access the target physical address, based on whether the compressed GPI cached in the GPI cache for the target physical address indicates that the selected PAS specified for the memory access is allowed access to that target physical address. Hence, by applying compression this allows for more efficient caching of GPI and so reduces the amount of GPI cache capacity that has to be implemented in hardware, saving power and circuit area.

The GPI compressing circuitry can compress a block of GPI for multiple granules of physical addresses, to generate a block of compressed GPI for those multiple granules. Hence, the unit of granularity of the compression scheme may span multiple granules of physical addresses which each have separate GPI indicated in the granule protection descriptor loaded from memory. By applying the compression to a block of GPI for multiple granules, this is more efficient than applying compression separately to each individual GPI for a single granule, as the power and performance costs of performing the compression can be shared amongst multiple granules, and also caching overheads associated with caching the compressed GPI can be shared amongst multiple granules. For example, the compressed GPI for the multiple granules can be cached in the same entry of the GPI cache so that a single set of cache tag information can be shared amongst the compressed GPI for the block of multiple granules of physical addresses, rather than providing separate cache tags for each individual granule in the block.

The compression scheme applied by the GPI compressing circuitry may be a lossy compression scheme. This means that some information is lost in converting the originally loaded GPI into the compressed GPI. When generating compressed GPI for a given granule of physical addresses, the information lost in the lossy compression scheme may be information indicative of whether at least one of the plurality of PASs is allowed access to the given granule of physical addresses. It may seem surprising that such a lossy compression scheme is desirable since if one of the PASs whose information is lost in the compression scheme is subsequently specified as the selected PAS for a later memory access request, then the cached compressed GPI will not provide information on whether that PAS is allowed to provide access to the target physical address of that later memory access request, and so this may require additional accesses to memory by the GPI loading circuitry which would not have been necessary if the original GPI from the granule protection descriptor had been cached.

However, the inventors recognised that in practice, while the GPI defined in the granule protection descriptors in memory may provide information on whether each of the PASs is allowed to provide access to a given target physical address, not all of the PASs will actually end up being specified as the selected PAS for memory access requests to the given target physical address. In practice, memory accesses violating the checks provided by the filtering circuitry may be relatively rare, as most software will be well behaved and will access memory within the limits defined by the granule protection descriptors in memory. Hence, it is likely that, for a given granule of physical addresses, accesses to that granule from at least one of the PASs may be extremely rare or may not even occur at all, and so caching the full GPI in the GPI cache without compression can unnecessarily consume cache storage capacity but may not significantly boost performance. Hence, the inventors recognised that the lossy compression scheme is acceptable and actually helps to improve the balance between performance and the area and power consumption costs of implementing GPI caching.

Hence, the compressed GPI associated with a given granule of physical addresses may be indicative of which of a proper subset of the plurality of PASs is allowed access to the given granule of physical addresses. The proper subset is a subset of PASs which excludes at least one PAS, for which the compressed GPI will not provide any information about whether that at least one PAS is allowed access to the given granule of physical addresses.

It can be useful for the proper subset of the PASs to include the PAS indicated as the selected PAS associated with the memory access request which caused the compressed GPI to be generated from the GPI specified by the at least one granule protection descriptor loaded by the granule protection information loading circuitry. This exploits the fact that once one memory access request has been seen specifying a given PAS as the selected PAS when accessing a particular granule of physical addresses, it is likely that further access requests to that granule or to nearby granules may also specify the same PAS. Therefore, performance can be improved by generating the compressed GPI so that the selected PAS of the memory access request which caused the GPI to be loaded (e.g. a request which missed in the GPI cache) is included as one of the subset of PASs for which the compressed GPI provides information on whether access to the given granule of physical addresses is allowed.

The GPI cache can store a number of GPI cache entries each for specifying the compressed GPI for a corresponding group of one or more granules of physical addresses. Each GPI cache entry may be tagged with an address tag indicative of which granules of physical addresses are in the corresponding group, and a PAS tag indicative of a tagged PAS. As the compression scheme may have lost information relating to some PASs, providing a PAS tag can be useful for enabling the filtering circuitry on a lookup of the GPI cache to determine whether the compressed information provides any information relevant to the selected PAS specified for a given memory access request. The PAS tag can be used on a lookup of the cache to determine whether there is a hit or miss in the GPI cache.

The GPI may support storing two or more separate cache entries having the same address tag but different PAS tags. This can allow information about a wider range of PASs for a given granule of physical addresses to be cached even if there is insufficient space in a single cache entry to provide compressed GPI relating to each of those multiple PASs.

The compressed GPI specified in a given GPI cache entry for a given granule of physical addresses may be indicative of whether the tagged PAS indicated by the PAS tag of the given cache entry is allowed access to the given granule of physical addresses. By providing such a PAS tag, this avoids the need for the cached GPI to provide information about other PASs other than the one or more PASs indicated by the tag, enabling a more concise format of cached information than if the originally loaded GPI was cached.

In some implementations, the PAS tag may specify a single tagged PAS. This may be more efficient in terms of circuit area as it reduces the complexity of encoding the tag and the compressed GPI. In practice, the number of physical address granules that are accessed by one more than one PAS may be relatively small and so it may not be considered justified to expend circuit area and power on supporting multiple PASs as tagged PASs in the same cache entry.

However, in other examples the GPI cache may use an encoding of the PAS tag and the compressed GPI that allows multiple tagged PASs to be identified for the same GPI cache entry, with the compressed GPI indicating, for those tagged PASs (less than the total number of PASs supported), information about whether the granule of physical addresses can be accessed from that subset of PASs. This approach can still be more efficient in terms of circuit area than caching the original GPI from the loaded granule protection descriptors, but may lose less information in the compression than an approach which supports only a single tagged PAS per entry.

The apparatus may have GPI cache lookup circuitry to lookup the GPI cache based on the selected PAS associated with the memory access request and the target physical address associated with the memory access request. Here the selected PAS can be compared with the tagged PAS indicated by the PAS tag of at least one cache entry, and the target physical address can be compared with the address tag of that at least one GPI cache entry, to determine whether there is a hit or a miss in the GPI cache for the current memory access request.

The GPI cache lookup circuitry may detect a hit in the GPI cache for the memory access request when the GPI cache includes a valid GPI cache entry for which both: the address tag corresponds to the target address; and the PAS tag corresponds to the selected PAS associated with the memory access request. Hence, if either the address tag comparison or the PAS tag comparison detects a mismatch then the memory access request does not hit on that particular cache entry.

In response to the GPI cache lookup circuitry identifying a miss in the GPI cache for the target physical address and the selected PAS, the GPI cache lookup circuitry may: trigger the GPI loading circuitry to load from the memory system the at least one granule protection descriptor, including a granule protection descriptor providing the GPI for one or more granules of physical addresses, the one or more granules including a target granule of physical addresses including the target physical address; trigger the GPI compressing circuitry to compress the GPI loaded by the GPI loading circuitry, and allocate at least one new entry to the GPI cache specifying at least part of the compressed GPI generated by the GPI compressing circuitry, where the PAS tag of the at least one new entry identifies the selected PAS as the tagged PAS. Hence, the GPI loading and compression is triggered by a miss in the GPI cache, when the GPI cache lookup circuitry has not identified any valid GPI cache entry for which both the address tag and the PAS tag correspond to the target physical address and selected PAS. The selected PAS of the memory access request that missed is specified as a tagged PAS for the newly allocated entry in the GPI cache which is allocated to store the compressed GPI generated in response to the miss.

In some implementations, on a miss in the GPI cache, a single new entry is allocated to the GPI cache, specifying the selected PAS as the tagged PAS.

However, in other implementations, in response to identifying the miss in the GPI cache, in addition to the entry allocated specifying the selected PAS as the tagged PAS, the GPI cache lookup circuitry could also allocate at least one additional new entry to the GPI cache specifying part of the compressed GPI generated by the GPI compressing circuitry, where the PAS tag of the at least one additional new entry identifies, as the tagged PAS, a PAS, other than the selected PAS of the memory access request which missed. For example, as well as decoding the compressed GPI relating to the selected PAS of the memory access request that missed, the GPI compressing circuitry can also decode compressed GPI relating to at least one other PAS (which does not already have an entry existing in the GPI cache) and allocate an additional entry for that other PAS. Which other PAS is decoded can vary depending on the implementation. In an implementation supporting allocation of at least one additional new entry, it is not essential for such an additional allocation to be performed on every miss—whether an additional allocation is made may depend on runtime factors such as current GPI cache occupancy and on which PAS was specified as the selected PAS.

Some systems which support distinct PASs in this way may only support two domains each associated with a corresponding PAS, to allow secure software operating in a secure domain to be isolated from less secure software operating in a less secure domain. However, increasingly there is a desire for a software provider to be provided with a secure computing environment which limits the need to trust other software providers associated with other software executing on the same hardware platform. For example, there may be a number of uses in fields such as mobile payment and banking, enforcement of anti-cheating or pirating mechanisms, security enhancements for secure virtual machine hosting in a cloud system, confidential computing, etc., where a party providing software code may not be willing to trust another party which provides software code to be executed on the same physical platform. Increasingly this may even be the case between two or more different parties which each want to be provided with secure computing environments isolated from a less secure environment associated with normal application-level code, but do not trust each other, and so it may be useful to be able to support three or more distinct domains each associated with a corresponding PAS. Also, support for additional domains/ PASs can be useful for protecting application code/data from more privileged software like an operating system or hypervisor. In some examples there may be four or more domains, and so the processing circuitry may support selection between at least four different PASs.

The apparatus may have PAS selection circuitry to select the selected PAS for the memory access request based on at least one of: a current domain of operation; and information specified in a page table entry that also provides address mapping information used by the address translation circuitry for translating the target virtual address into the target physical address. The PAS selection circuitry could be part of the address translation circuitry, or could be part of the filtering circuitry, for example. Where processing circuitry supports different domains of operation, the selection of the selected PAS may depend on the current domain of the processing circuitry. It is also possible for different PASs to be accessed from within a single domain, at least for some domains of operation, and in this case information specified in a page table entry can be used to select the selected PAS to be used for a given memory access request.

In one particular example, processing circuitry may process instructions in one of a plurality of domains of operation and those domains may include at least a non-secure domain, a secure domain, a realm domain and a root domain. In this case, the PASs may comprise:
- a root PAS selectable as the selected PAS when a current domain of the processing circuitry is the root domain (the root PAS may be prohibited from being selected as the selected PAS when the current domain is the secure domain, the realm domain or the root domain);
- a non-secure PAS selectable as the selected PAS when the current domain of the processing circuitry is any of the non-secure domain, the secure domain, the realm domain and the root domain;
- a secure PAS selectable as the selected PAS when the current domain of the processing circuitry is the secure domain or the root domain (the secure PAS may be prohibited from being selected as the selected PAS when the current domain is the non-secure domain or the realm domain); and
- a realm PAS selectable as the selected PAS when the current domain of the processing circuitry is the realm domain or the root domain (the realm PAS may be prohibited from being selectable as the selected PAS when the current domain is the non-secure domain or the secure domain).

This approach of having a root domain which can access all of the PASs, a non-secure domain which can access only its non-secure PAS, and secure and realm PASs which can both access the non-secure PAS and its own PAS but cannot access each other's PAS or the root PAS, can be useful to allow multiple mutually distrusting parties to implement code on a shared hardware platform while each being provided with some hardware-enforced guarantees that protect their code and data from access by other code operating on the same system while not being able to access each other's code and data.

The memory system may include a point of physical aliasing (PoPA), which is a point at which aliasing physical addresses from different PASs which correspond to the same memory system resource are mapped (de-aliased) to a single physical address uniquely identifying that memory system resource. The memory system may include at least one pre-PoPA memory system component which is provided upstream of the PoPA, which treats the aliasing physical addresses as if they correspond to different memory system resources.

For example, the at least one pre-PoPA memory system component could include a cache which may cache data or program code for the aliasing physical addresses in separate entries, so that if the same memory system resource is requested to be accessed from different PASs, then the accesses will cause separate cache entries to be allocated. Also, the pre-PoPA memory system component could include coherency control circuitry, such as a coherent interconnect, snoop filter, or other mechanism for maintaining coherency between cached information at respective requester devices. The coherency control circuitry could assign separate coherency states to the respective aliasing physical addresses in different PASs. Hence, the aliasing physical addresses are treated as separate addresses for the purpose of maintaining coherency even if they do actually correspond to the same underlying memory system resource. Although on the face of it, tracking coherency separately for the aliasing physical addresses could appear to cause a problem of loss of coherency, in practice this is not a problem because if processes operating in different domains are really intended to share access to a particular memory system resource then they can use the less secure PAS to access that resource (or use the restrictive sharing feature described below to access the resource using one of the other PASs). Another example of a pre-PoPA memory system component may be a memory protection engine which is provided for protecting data saved to off-chip memory against loss of confidentiality and/or tampering. Such a memory protection engine could, for example, separately encrypt data associated with a particular memory system resource with different encryption keys depending on which PAS the resource is accessed from, effectively treating the aliasing physical addresses as if they were corresponding to different memory system resources (e.g. an encryption scheme which makes the encryption dependent on the address may be used, and the PAS identifier may be considered to be part of the address for this purpose).

Regardless of the form of the pre-PoPA memory system component, it can be useful for such a PoPA memory system component to treat the aliasing physical addresses as if they correspond to different memory system resources, as this provides hardware-enforced isolation between the accesses issued to different PASs so that information associated with one domain cannot be leaked to another domain by features such as cache timing side channels or side channels involving changes of coherency triggered by the coherency control circuitry.

It may be possible, in some implementations, for the aliasing physical addresses in the different PASs to be represented using different numeric physical address values for the respective different PASs. This approach may require a mapping table to determine at the PoPA which of the different physical address values correspond to the same memory system resource. However, this overhead of maintaining the mapping table may be considered unnecessary, and so in some implementations it may be simpler if the aliasing physical addresses comprise physical addresses which are represented using the same numeric physical address value in each of the different PASs. If this approach is taken then, at the point of physical aliasing, it can be sufficient simply to discard the PAS identifier which identifies which PAS is accessed using a memory access, and then to provide the remaining physical address bits downstream as a de-aliased physical address.

Hence, the memory system may also include a PoPA memory system component configured to de-alias the plurality of aliasing physical addresses to obtain a de-aliased physical address to be provided to at least one downstream memory system component. The PoPA memory system component could be a device accessing a mapping table to find the dealiased address corresponding to the aliasing address in a particular address space, as described above. However, the PoPA component could also simply be a location within the memory system where a PAS identifier identifying the selected PAS associated with a given memory access is discarded so that the physical address provided downstream uniquely identifies a corresponding memory system resource regardless of which PAS this was provided from. Alternatively, in some cases the PoPA memory system component may still provide the PAS identifier to the at least one downstream memory system component (e.g. for the purpose of enabling completer-side filtering as discussed further below), but the PoPA may mark the point within the memory system beyond which downstream memory system components no longer treat the aliasing physical addresses as different memory system resources, but consider each of the aliasing physical addresses to map the same memory system resource. For example, if a memory controller or a hardware memory storage device downstream of the PoPA receives the PAS identifier and a physical address for a given memory access request, then if that physical address corresponds to the same physical address as a previously seen transaction, then any hazard checking or performance improvements performed for respective transactions accessing the same physical address (such as merging accesses to the same address) may be applied even if the respective transactions specified different PAS identifiers. In contrast, for a memory system component upstream of the PoPA, such hazard checking or performance improving steps taken for transactions accessing the same physical address may not be invoked if these transactions specify the same physical address in different PASs.

The GPI cache can be implemented in different ways. In one example, the GPI cache may be a combined structure shared with a translation lookaside buffer (TLB) which is used to cache address mapping information used by the address translation circuitry for translating the target virtual address into the target physical address. For example, the GPI cache could be the TLB itself and the TLB may cache both the compressed GPI and the address mapping information. In this case, circuitry for looking up the combined TLB/GPI cache may be capable of looking up the combined structure both based on a virtual address (if performing a lookup to obtain address mapping information) and based on a physical address (if performing a lookup to obtain compressed GPI). Hence, in the combined structure each cache entry could have an entry type indicator which distinguishes whether the entry provides address mapping information or compressed GPI, and the entry type indicator may be used to determine whether a lookup for a given address hits on a given entry, to avoid a lookup for address mapping information based on a virtual address aliasing against the physical address specified in an address tag for a given cache entry providing compressed GPI, or a lookup for compressed GPI based on a physical address aliasing against the virtual address specified in an address tag for a given cache entry providing address mapping information.

Alternatively, the GPI cache could be a separate structure from the TLB which caches address mapping information used for address translation.

SPECIFIC EXAMPLES

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating. While FIG. 1 shows the current domain indication 14 and current exception level indication 15 as distinct status values, it is also possible that the current domain and/or exception level may be determined based on a current values of set of multiple control bits stored in one or more control registers, so it is not essential to provide a single distinct status value encoding the current domain or the current exception level.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one or more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces (PASs) associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information (GPI) stored in a granule protection table structure stored within the memory system. The granule protection information may be cached within a granule protection information cache 22, similar to a caching of page table data in the TLB 18. While the granule protection information cache 22 is shown as a separate structure from the TLB 18 in the example of FIG. 1, in other examples these types of lookup caches could be combined into a single lookup cache structure as discussed further below. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

As shown in FIG. 1, the apparatus has circuitry to support the PA filter 20 in obtaining the GPI it needs to perform the PAS checking. GPI lookup circuitry 21 controls lookups to the GPI cache 22 and allocation of entries into the GPI cache 22. GPI loading circuitry 23 controls performing GPI walk operations to load granule protection descriptors from a granule protection structure stored in the memory system. As discussed further below, GPI compressing circuitry 25 compresses the GPI obtained from granule protection descriptors loaded by the GPI loading circuitry 23, so that the compressed GPI can be cached in the GPI cache 22.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example of address translation circuitry 16 and PAS filter 20 provided within a requester 4, other types of requesters could use address translation functionality provided by a separate system memory management unit (SMMU) which is a separate component from the requester 4 itself. In that case, the SMMU may be coupled to the interconnect and may perform similar functions to those of the address translation circuitry 16 and PAS filter 20 shown in FIG. 1, and may have a similar GPI cache 22, GPI lookup circuitry 21, GPI loading circuitry 23 and GPI compressing circuitry 25.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
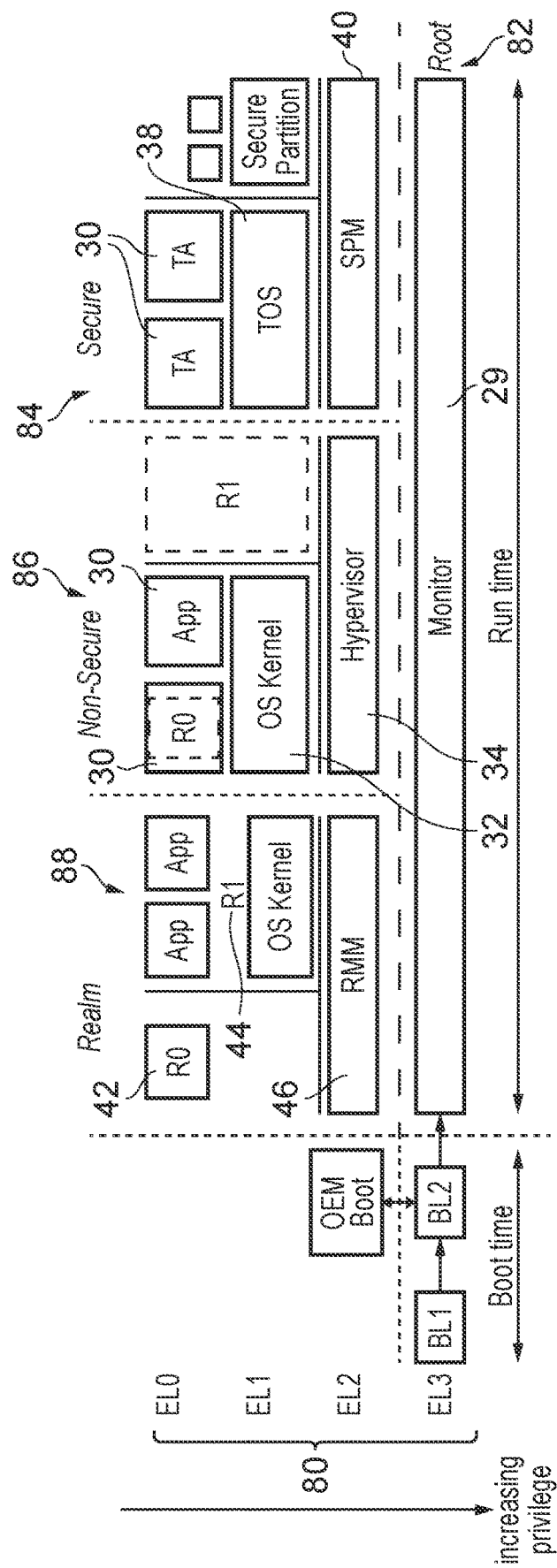
FIG. 2 illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, EL1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level ED is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, ED or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at ED and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at ED1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 84. In the realm domain, the software executed can include a number of realms, where each realm can be isolated from other realms by a realm management module (RMM) 46 operating at exception level EL2. The RMM 46 may control isolation between the respective realms 42, 44 executing in the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and ED. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code R0, R1 associated with realms 42, 44 respectively, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
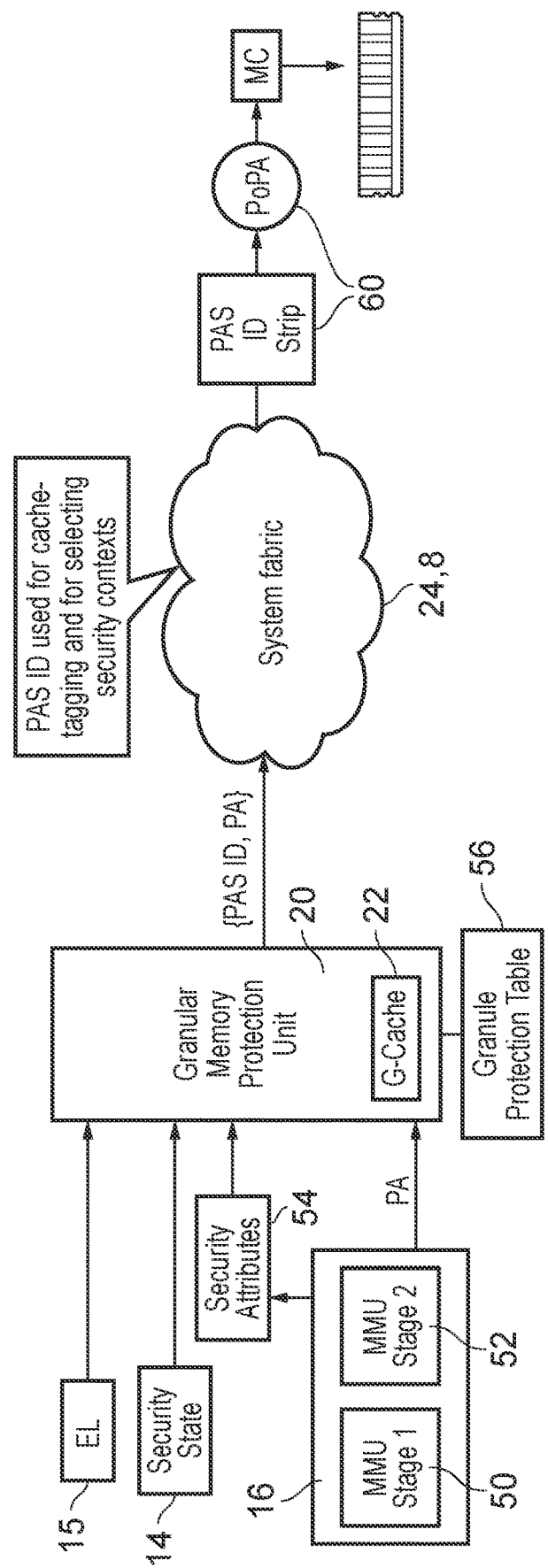
FIG. 3 illustrates an example of a processing system supporting granule protection lookups.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or ED code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or ED1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS identifier.

A given World is allowed access to a subset of Logical Physical Address Spaces. This is enforced by a hardware filter 20 that can be attached to the output of the Memory Management Unit 16.

A World defines the security attributes (for determining the PAS identifier) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS ID as they propagate throughout the system fabric 24, 8 until reaching a location defined as the Point of Physical Aliasing 60. This allows to locate the filter on the requester-side without diminishing the security guarantees comparing to completer-side filtering. As the transaction propagates throughout the system, the PAS ID can be used as an in-depth security mechanism for address isolation: e.g. caches can add the PAS ID to the address tag in the cache, preventing accesses made to the same PA using the wrong PAS ID from hitting in the cache and therefore improving side-channel resistance. The PAS ID can also be used as context selector for a Protection Engine attached to the memory controller that encrypts data before it is written to external DRAM.

The Point of Physical Aliasing (PoPA) is a location in the system where the PAS ID is stripped and the address changes back from a Logical Physical Address to a System Physical Address. The PoPA can be located below the caches, at the completer-side of the system where access to the physical DRAM is made (using encryption context resolved through the PAS ID). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, an instruction is supported by the System—"Data Clean and Invalidate to the Point of Physical Aliasing" which EL3 can submit before transitioning a page to the new PAS—this guarantees that any residual state associated with the previous PAS is flushed from any caches upstream of the PoPA 60 (closer to the requester-side than the PoPA 60).

Another property that can be achieved by attaching the GMPU 20 to the requester side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS ID. As an example, the GPI can indicate that a physical Granule can be accessed only by "Realm World" 88 and "Secure World" 84 while being tagged with the PAS ID of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

Figure 4:
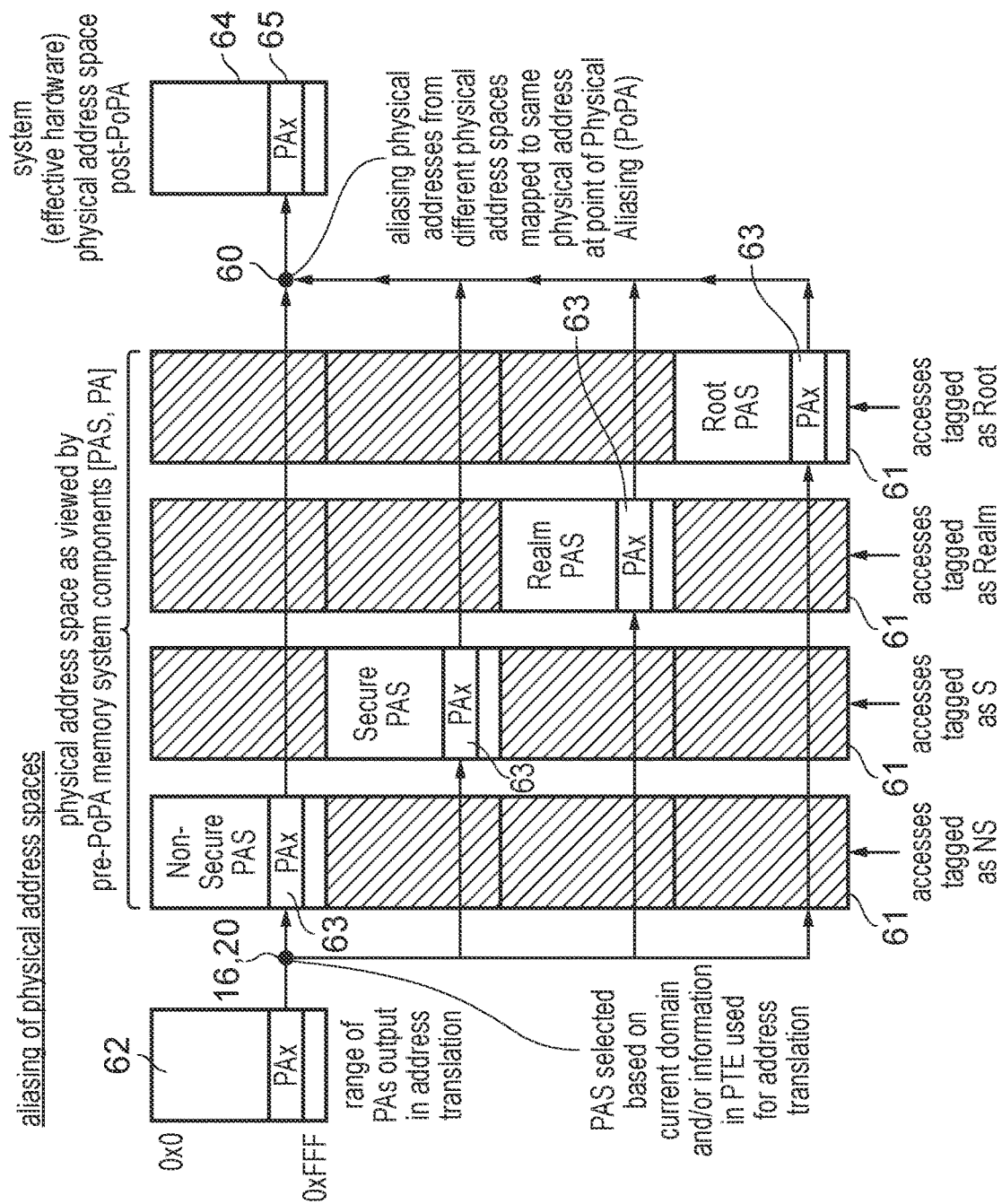
FIG. 4 schematically illustrates aliasing of a number of physical address spaces onto a system physical address space identifying locations in the memory system.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
| --- | --- | --- | --- | --- |
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63 all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

The system may include more than one PoPA 60. At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

Figure 5:
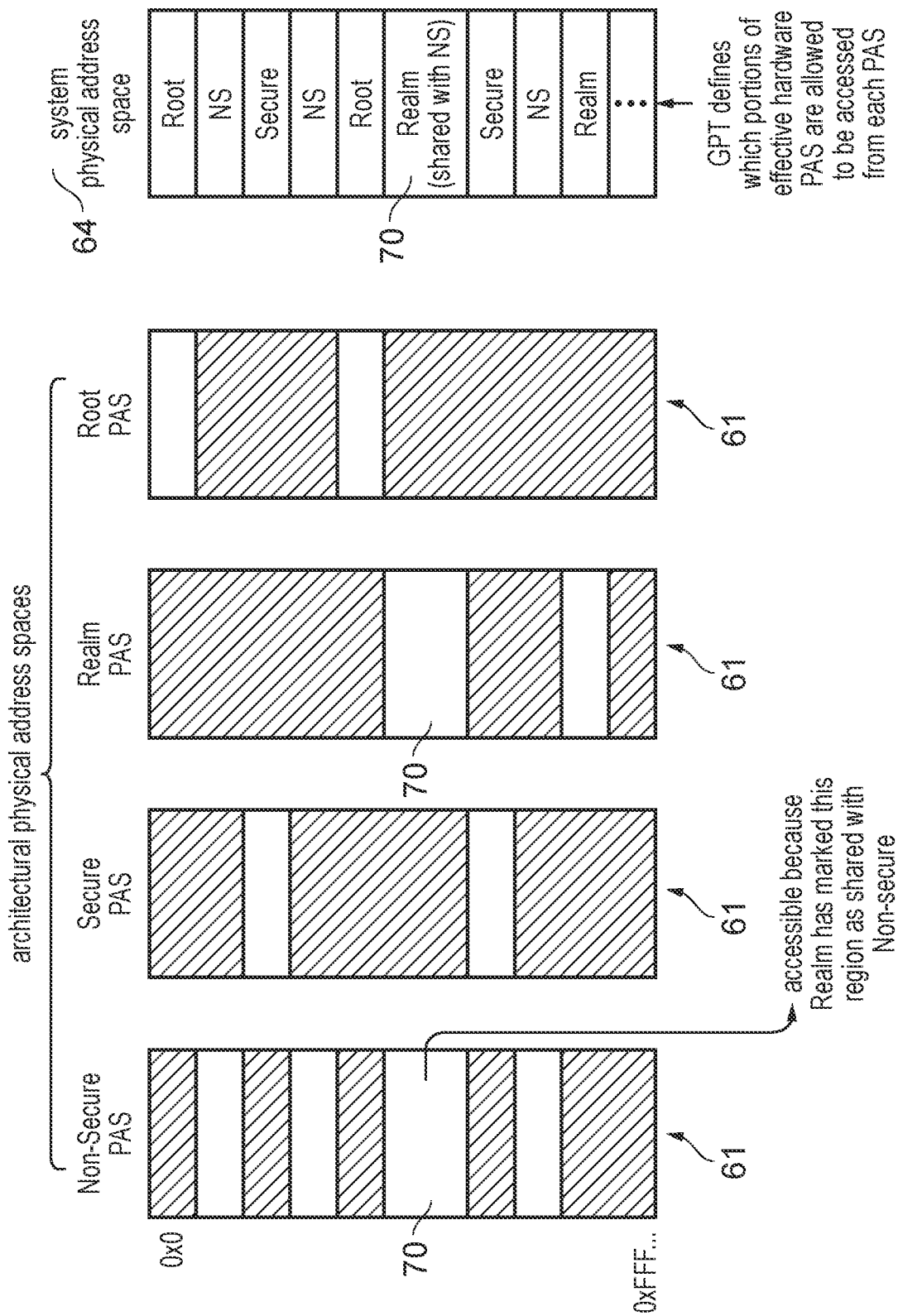
FIG. 5 illustrates an example of partitioning the effective hardware physical address space so that different architectural physical address spaces have access to respective portions of the system physical address space.

FIG. 5 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 5 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 86 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 5, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

Figure 6:
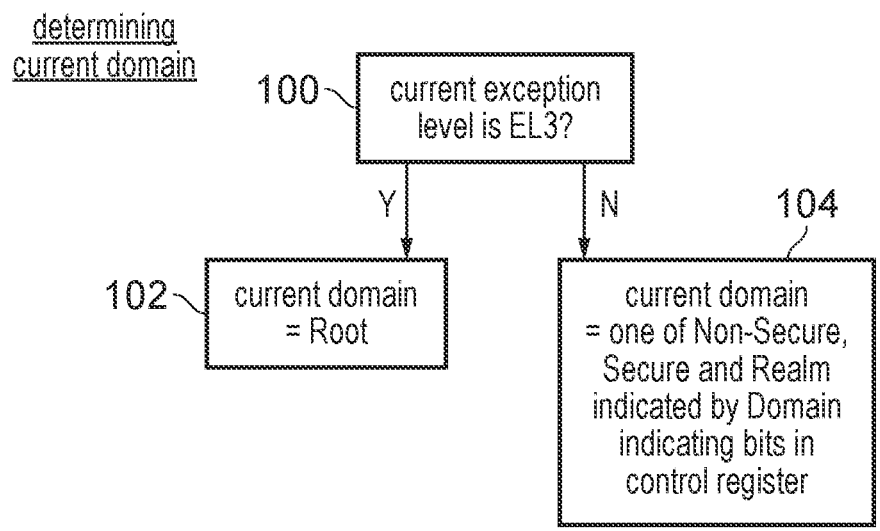
FIG. 6 is a flow diagram illustrating a method of determining the current domain of operation of the processing circuitry.

FIG. 6 is a flow diagram showing how to determine the current domain of operation, which could be performed by the processing circuitry 10 or by address translation circuitry 16 or the PAS filter 20. At step 100 it is determined whether the current exception level 15 is EL3 and if so then at step 102 the current domain is determined to be the root domain 82. If the current exception level is not EL3, then at step 104 the current domain is determined to be one of the non-secure, secure and realm domains 86, 84, 88 as indicated by at least two domain indicating bits 14 within an EL3 control register of the processor (as the root domain is indicated by the current exception level being EL3, it may not be essential to have an encoding of the domain indicating bits 14 corresponding to the root domain, so at least one encoding of the domain indicating bits could be reserved for other purposes). The EL3 control register is writable when operating at EL3 and cannot be written from other exception levels EL2-EL0.

Figure 7:
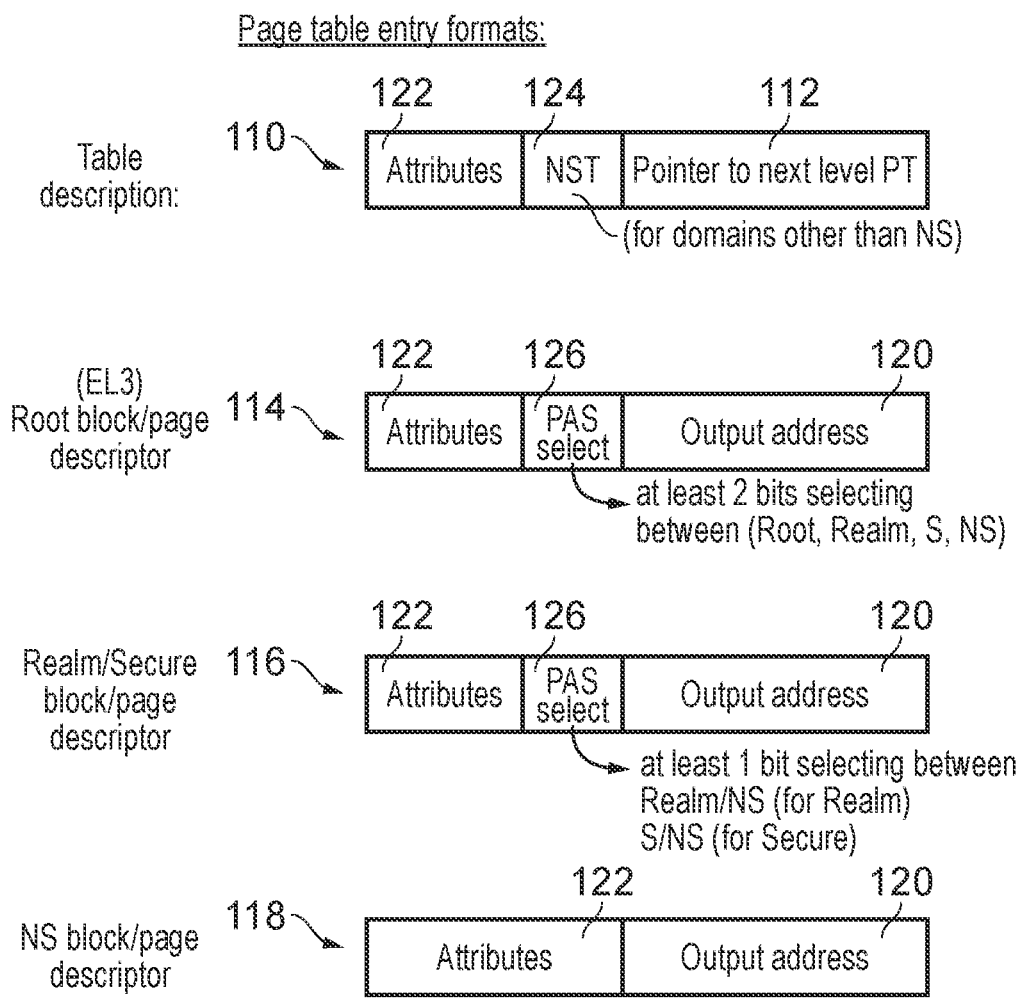
FIG. 7 shows examples of page table entry formats for page table entries used for translating virtual addresses to physical addresses.

FIG. 7 shows an example of page table entry (PTE) formats which can be used for page table entries in the page table structures used by the address translation circuitry 16 for mapping virtual addresses to physical addresses, mapping virtual addresses to intermediate addresses or mapping intermediate addresses to physical addresses (depending on whether translation is being performed in an operating state where a stage 2 translation is required at all, and if stage 2 translation is required, whether the translation is a stage 1 translation or a stage 2 translation). In general, a given page table structure may be defined as a multi-level table structure which is implemented as a tree of page tables where a first level of the page table is identified based on a base address stored in a translation table base address register of the processor, and an index selecting a particular level 1 page table entry within the page table is derived from a subset of bits of the input address for which the translation lookup is being performed (the input address could be a virtual address for stage 1 translations of an intermediate address for stage 2 translations). The level 1 page table entry may be a "table descriptor" 110 which provides a pointer 112 to a next level page table, from which a further page table entry can then be selected based on a further subset of bits of the input address. Eventually, after one or more lookups to successive levels of page tables, a block or page descriptor PTE 114, 116, 118 may be identified which provides an output address 120 corresponding to the input address. The output address could be an intermediate address (for stage 1 translations performed in an operating state where further stage 2 translation is also performed) or a physical address (for stage 2 translations, or stage 1 translations when stage 2 is not needed).

To support the distinct physical address spaces described above, the page table entry formats may, in addition to the next level page table pointer 112 or output address 120, and any attributes 122 for controlling access to the corresponding block of memory, also specify some additional state for use in physical address space selection.

For a table descriptor 110, the PTEs used by any domain other than the non-secure domain 86 includes a non-secure table indicator 124 which indicates whether the next level page table is to be accessed from the non-secure physical address space or from the current domain's physical address space. This helps to facilitate more efficient management of page tables. Often the page table structures used by the root, realm or secure domains 24 may only need to define special page table entries for a portion of the virtual address space, and for other portions the same page table entries as used by the non-secure domain 26 could be used, so by providing the non-secure table indicator 124 this can allow higher levels of the page table structure to provide dedicated realm/secure table descriptors, while at a certain point of the page table tree, the root realm or secure domains could switch to using page table entries from the non-secure domain for those portions of the address space where higher security is not needed. Other page table descriptors in other parts of the tree of page tables could still be fetched from the relevant physical address space associated with the root, realm or the secure domain.

On the other hand, the block/page descriptors 114, 116, 118 may, depending on which domain they are associated with, include physical address space selection information 126. The non-secure block/page descriptors 118 used in the non-secure domain 86 do not include any PAS selection information because the non-secure domain is only able to access the non-secure PAS. However for the other domains the block/page descriptor 114, 116 includes PAS selection information 126 which is used to select which PAS to translate the input address into. For the root domain 22, EL3 page table entries may have PAS selection information 126 which includes at least 2 bits to indicate the PAS associated with any of the 4 domains 82, 84, 86, 88 as the selected PAS into which the corresponding physical address is to be translated. In contrast, for the realm and secure domains, the corresponding block/page descriptor 116 need only include one bit of PAS selection information 126 which, for the realm domain, selects between the realm and non-secure PASs, and for the secure domain selects between the secure and non-secure PASs. To improve efficiency of circuit implementation and avoid increasing the size of page table entries, for the realm and secure domains the block/page descriptor 116 may encode the PAS selection information 126 at the same positon within the PTE, regardless of whether the current domain is realm or secure, so that the PAS selection bit 126 can be shared.

Figure 8:
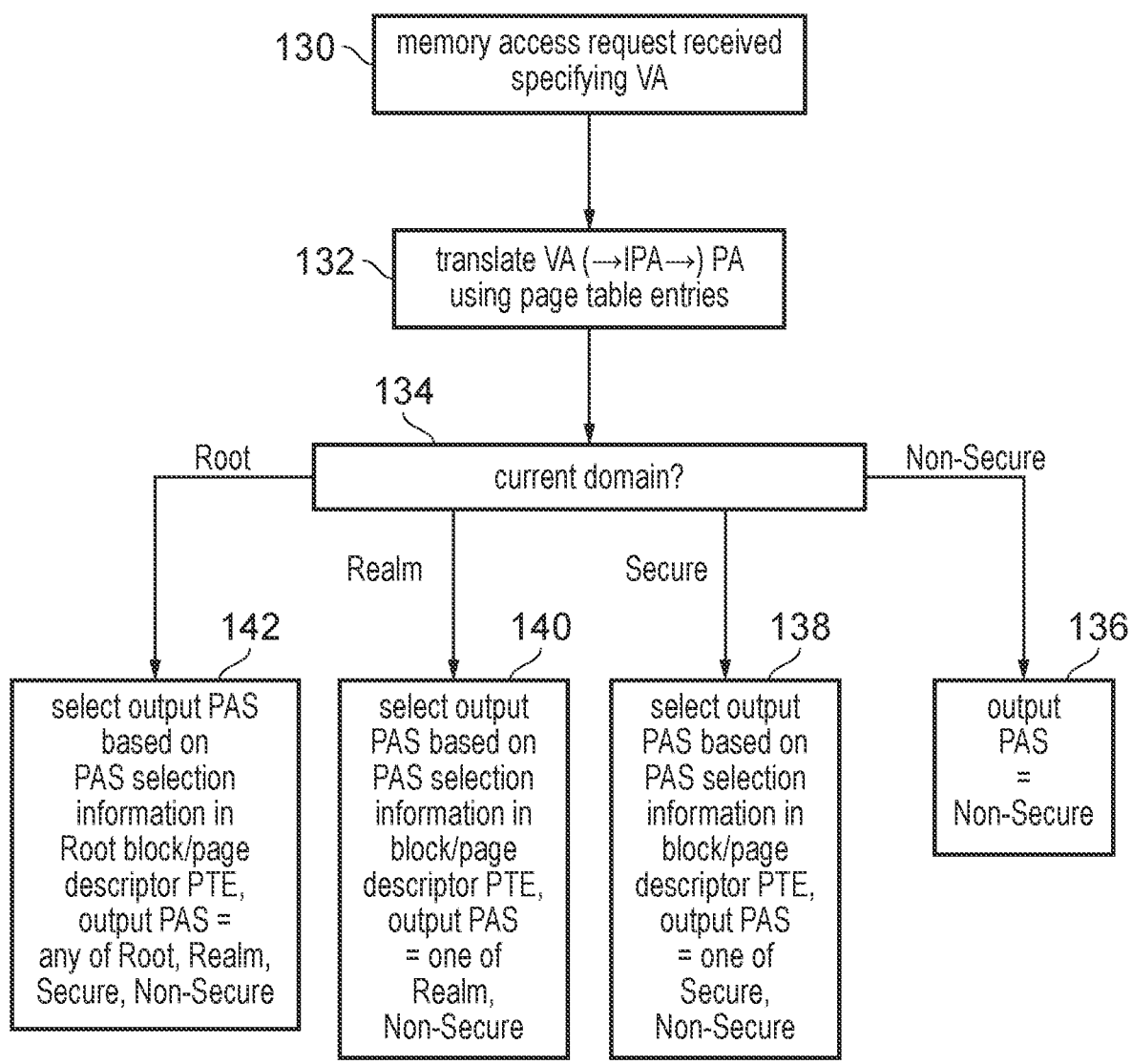
FIG. 8 is a flow diagram showing a method of selecting a physical address space to be accessed by a given memory access request.

Hence, FIG. 8 is a flow diagram showing a method of selecting the PAS based on the current domain and the information 124, 126 from the block/page PTE used in generating the physical address for a given memory access request. The PAS selection could be performed by the address translation circuitry 16, or if the address translation circuitry forwards the PAS selection information 126 to the PAS filter 20, performed by a combination of address translation circuitry 16 and the PAS filter 20.

At step 130 in FIG. 8, the processing circuitry 10 issues a memory access request specifying a given virtual address (VA) as a target VA. At step 132 the address translation circuitry 16 looks up any page table entries (or cached information derived from such page table entries) in its TLB 18. If any required page table information is not available, address translation circuitry 16 initiates a page table walk to memory to fetch the required PTEs (potentially requiring a series of memory accesses to step through respective levels of the page table structure and/or multiple stages of address translation for obtaining mappings from a VA to an intermediate address (IPA) and then from an IPA to a PA). Note that any memory access requests issued by the address translation circuitry 16 in the page table walk operations may themselves be subject to address translation and PAS filtering, so the request received at step 130 could be a memory access request issued to request a page table entry from memory. Once the relevant page table information has been identified, the virtual address is translated into a physical address (possibly in two stages via an IPA). At step 134 the address translation circuitry 16 or the PAS filter 20 determines which domain is the current domain, using the approach shown in FIG. 6.

If the current domain is the non-secure domain then at step 136 the output PAS selected for this memory access request is the non-secure PAS.

If the current domain is the secure domain, then at step 138 the output PAS is selected based on the PAS selection information 126 which was included in the block/page descriptor PTE which provided the physical address, where the output PAS will be selected as either secure PAS or non-secure PAS.

If the current domain is the realm domain, then at step 140 the output PAS is selected based on the PAS selection information 126 included in the block/page descriptor PTE from which the physical address was derived, and in this case the output PAS is selected as either the realm PAS or the non-secure PAS.

If at step 134 the current domain is determined to be the root domain, then at step 142 the output PAS is selected based on the PAS selection information 126 in the root block/page descriptor PTE 114 from which the physical address was derived. In this case the output PAS is selected as any of the physical address spaces associated with the root, realm, secure and non-secure domains.

Figure 9:
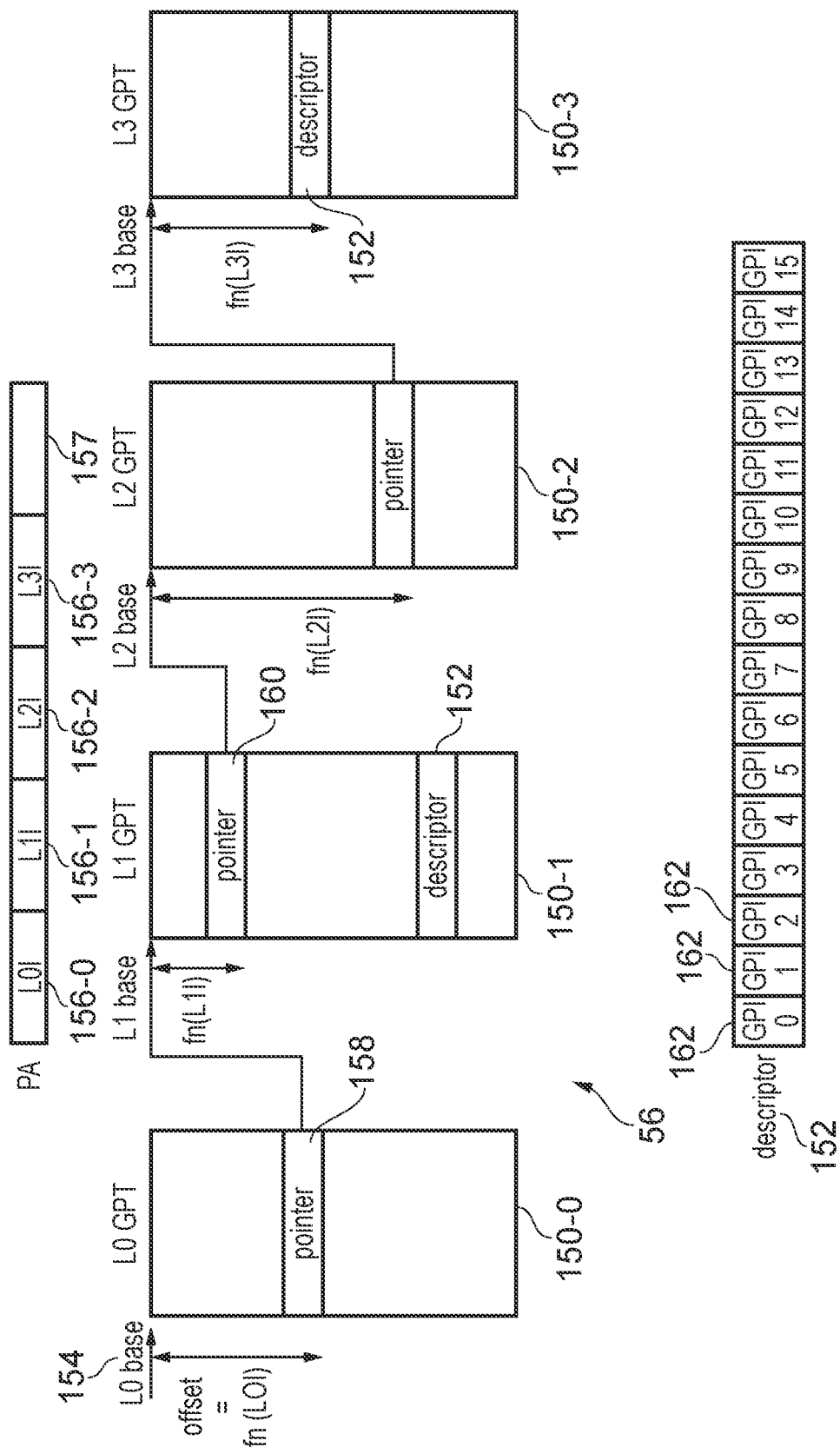
FIG. 9 illustrates an example of obtaining granule protection descriptors from a granule protection table.

FIG. 9 illustrates an example structure of the GPT 56. The GPT may comprise a hierarchical structure comprising a number of levels of granule protection table 150, each level capable of providing granule protection descriptors 152 providing granule protection information (GPI). In this example, the table is a 4-level structure comprising level 0, level 1, level 2 and level 3 granule protection tables 150-0, 150-1, 150-2, 150-3. The GPI loading circuitry 23 is responsible for walking the table structure to obtain the granule protection descriptor 152 relating to a particular physical address, by generating sequences of memory accesses to traverse the table structure based on a trail of pointers encoded in the tables 150. The GPI loading circuitry 23 maintains a level 0 base address 154 which identifies a base address of the level 0 GPT 150-0, and applies an offset to that level 0 base address 154, with the offset derived as a function of a level 0 index portion 156-0 of the target physical address of the memory access for which the GPT walk is to be performed. The GPT walk may be performed in response to a miss being identified in the GPI cache 22 when looked up for a given memory access request.

The address obtained by applying the offset to the level 0 base address is used to access a level 0 GPT entry 158 which provides a pointer indicating the base address of the level 1 GPT 150-1 corresponding to the target physical address. The level 1 GPT entry 160 corresponding to the target physical address can be identified by applying an offset relative to the base address, with the offset derived from a level 1 index portion 156-1 of the physical address. Again, the level 1 GPT entry may return a pointer which provides the level 2 base address of the level 2 GPT 150-2, where the relevant entry can be identified based on a level 2 index portion 156-2 of a physical address. The pointer from the level 2 table then identifies the base address of a level 3 GPT 150-3 where the relevant entry for the target physical address is identified based on the level 3 base address and an offset derived from a level 3 index portion 156-3. A least significant portion 162 of the physical address is not used for the indexing of the GPT structure 56 and the number of bits in that least significant portion depends on the size of the unit of physical addresses that corresponds to a single granule protection descriptor in the GPT structure 56 (note that as the granule protection descriptor may contain GPI for multiple granules, this unit of physical addresses may be of a larger size than the size of a granule associated with a particular GPI).

When the walk reaches the bottom of the GPT structure 56 the granule protection descriptor 152 obtained from that entry provides GPI indicators 162 for a certain block of physical address granules (each granule corresponding to a unit of physical address space of a given size). In this example, each descriptor provides 16 GPI fields 162 for 16 separate granules of physical addresses. Each GPI indicator 162 has an encoding which enables the PA filter 20 to determine for the corresponding physical address granule which of the PASs is allowed to provide access to that physical address granule. For example, the GPI field 162 of the descriptor 152 could be a 4-bit value that determines the accesses permitted to each PAS. In one example encoding the 4-bit field is encoded as follows:

| GPI value | Meaning |
|---|---|
| 0b0000 | No accesses permitted |
| 0b1000 | Accesses permitted to Secure physical address space only |
| 0b1001 | Accesses permitted to Non-secure physical address space only |
| 0b1010 | Accesses permitted to Root physical address space only |
| 0b1011 | Accesses permitted to Realm physical address space only |
| 0b1111 | All accesses permitted |
| Other | Reserved |

If the descriptor 152 is accessed within the level 3 GPT then it may cover a relatively fine-grained region of memory, but it is also possible to provide granule protection descriptors 152 at higher levels of the page table structure (for example FIG. 9 shows a granule protection descriptor provided at level 1). A field of each GPT entry may indicate, for the higher levels of the table structure, whether the entry represents a pointer 160 to the next level of the table structure or provides a granule protection descriptor 152 directly. When a granule protection descriptor is found at a higher level of the table structure then this means that the GPIs in that granule protection descriptor apply to larger chunks of memory than if the granule protection descriptor is found in a lower level of the table structure. Hence, the size of the granule of physical addresses represented by each GPI indicator 162 may be variable depending on the level of the table at which the descriptor is found.

It will be appreciated that the number of levels in the GPT 56 and the number of GPIs 162 included in one granule protection descriptor 152 can vary and this is just one example. Note that while the GPI loading circuitry 23 may be walking the GPT 56 to identify the granule protection descriptor 152 corresponding to a particular target address of the memory access request that missed in the GPI cache 22, it is possible for the memory system 24, 8, 6 to return additional granule protection descriptors relating to other nearby portions of address space in response to the same walk, which could be cached pre-emptively to increase the likelihood that subsequent accesses to memory can be handled without a GPI cache miss 22. For example, in some implementations the GPI loading circuitry 23 may fetch a block of 4 or 8 or more granule protection descriptors 152 at once, depending on the bandwidth available in the memory system.

When granule protection descriptors 152 are obtained from memory in a GPT walk then information from those descriptors can be cached in the GPI cache 22. For providing sufficient performance, implementing a capacity of the GPI cache 22 sufficient for caching GPI for a reasonably large number of granules may be desirable, because the address translation circuitry 16 may use a 2-stage address translation scheme where 2 stages of hierarchical page table structures (similar in layout to the GPT hierarchy shown in FIG. 9) may be traversed to obtain page table mappings, with a first stage mapping virtual addresses to intermediate addresses under control of address mapping set by an operating system and a second stage mapping the intermediate address to a physical address under control of mapping information set by a hypervisor. As each stage 1 or stage 2 page table descriptor fetch could miss in the GPI cache 22 and then trigger a GPT walk associated with the physical address of the stage 1 or stage 2 page table entry, the number of GPT walks required (in the absence of GPI caching) can be very large. The better the efficiency of GPI caching, the fewer GPT walks will be required and hence the better performance. It is possible to provide caching both for intermediate entries obtained in GPT walks (e.g. the pointer 160 from an intermediate level of table can be cached in association with information identifying a corresponding set of target addresses for which that pointer applies, to speed up accessing entries at the next level on a future walk), and for full PA-to-GPI mappings representing the outcome of a full GPT walk.

For caching of GPI information from the final descriptor 152 obtained in the GPT walk, one approach to managing the GPI cache 22 could simply be to cache the descriptors 152 obtained from the GPT 56 directly in the GPI cache 22 with the GPIs 162 represented in their original format, but this would require 4 bits to be saved in the GPI cache 22 per physical granule, which can incur a high storage cost when considering the maximum number of granules for which it is desired to have sufficient GPI cache capacity to achieve a given level of performance.

However, in practice, while each GPI indicator 162 has 4 bits to provide information identifying, for all of the different PASs, which of those PASs is allowed to provide access to the physical address, not all of the PASs will actually be specified for memory accesses targeting a particular physical address granule. It is relatively common for a reasonable fraction of the physical address granules in the address space to only ever be accessed by one of the PASs. Therefore, caching the GPI in its uncompressed form can waste cache storage capacity.

In the examples discussed below, rather than saving the uncompressed GPI in the cache, compression is applied by the GPI compressing circuitry 25 so that fewer bits per granule need to be stored and this can either reduce the circuit area cost of providing cache storage covering a certain number of physical address granules, or allow a greater number of physical address granules to be cached in the GPI cache 22 for a certain amount of circuit area and power cost therefore improving performance.

Figure 10:
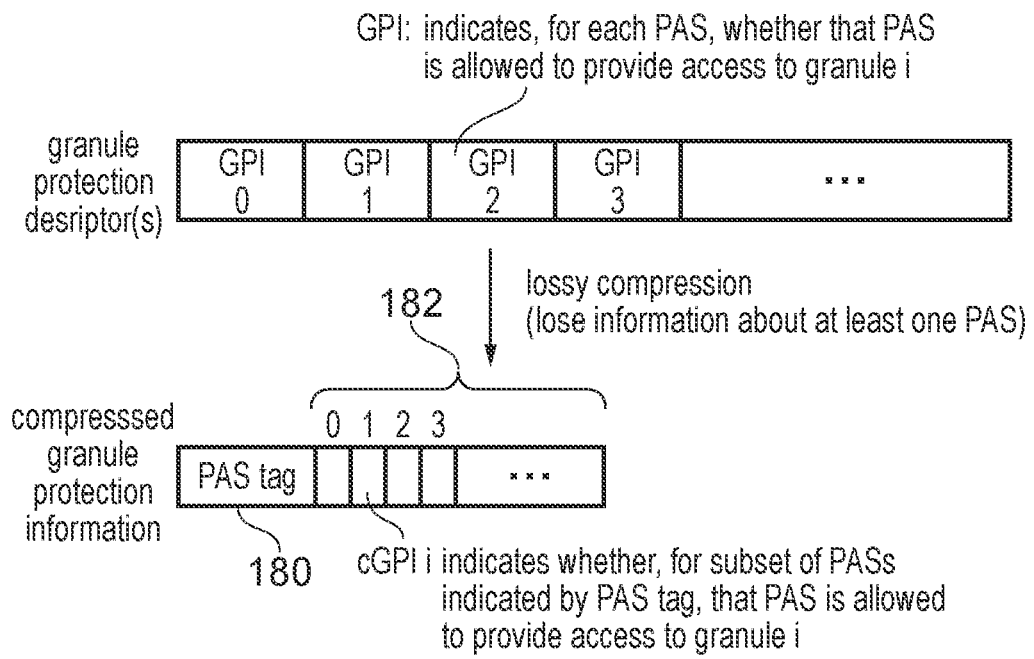
FIG. 10 illustrates a first example of compressing granule protection information from a loaded granule protection descriptor to obtain compressed granule protection information to be cached.

FIG. 10 illustrates an example of the compression scheme, in which the compressed GPI is associated with a PAS tag 180 which identifies the PAS that was the selected PAS of the memory access which triggered the GPT walk by the GPI loading circuitry 23, and the compressed GPI specifies a bitmap 182 of allowed/not-allowed indicators 182. Each indicator specifies, for a corresponding granule of physical addresses, whether the tagged PAS identified by the PAS tag 180 is allowed to provide access to the corresponding granule. The PAS tag 180 and the bitmap 182 of allowed/not-allowed indicators is cached in the GPI cache 22 in a given cache entry. If there are 4 PASs as in the example discussed earlier then the PAS tag 180 could be a 2-bit tag. Hence, with this approach the compression reduces 4N bits of uncompressed granule protection descriptor data covering N granules of physical addresses to N+2 bits of compressed GPI covering those same N physical address granules. For example, if N=64 (64 granules having GPI cached in one GPI cache entry) then the number of bits saved per cache entry is 256−66=190, which when multiplied by the number of GPI cache entries provided in total represents a considerable circuit area and power saving compared to caching the uncompressed granule protection descriptors. Hence, this allows for more efficient caching of GPI. The compression scheme shown in FIG. 10 is a lossy compression scheme, because while the originally loaded GPI in the granule protection descriptors specifies information about all the PASs, the compressed GPI loses the information about all but one of these PASs.

Figure 11:
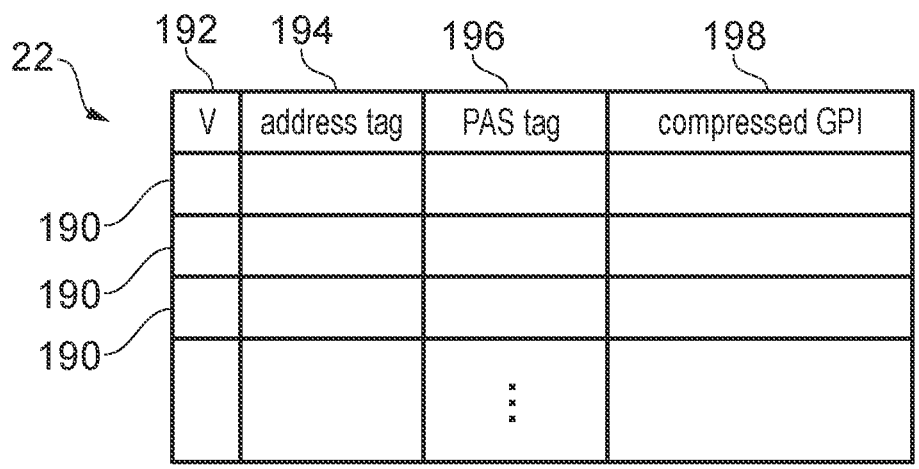
FIG. 11 shows an example of a granule protection information cache for caching compressed granule protection information.

FIG. 11 shows one example of a cache structure for the GPI cache 22. The GPI cache 22 includes a number of GPI cache entries 190 which each include a valid field 192 for indicating whether the entry is valid, an address tag field 194 for providing an address tag used to identify whether a given entry 190 corresponds to a specified physical address, a PAS tag field 196 which provides the PAS tag 180 of the compressed GPI and the compressed GPI field 198 which provides the bitmap 182 described above as an example of compressed GPI. The address tag field 194 is set corresponding to a base address for the group of consecutive physical address granules whose GPI is represented in the compressed GPI field 198, and subsequent bits of the physical address can be used as an offset into the compressed GPI field 198 for selecting the relevant bit of the bitmap 182 that corresponds to the target address.

Hence, when looking up the GPI cache 22 the GPI lookup circuitry 21 can compare the target physical address of the current memory access with the address tag 194 of a given cache entry 190 and compare the selected PAS for the memory access with the PAS tag 196 to determine whether both address and PAS tags 194, 196 correspond to the physical address and selected PAS of memory access. If either of the address tag comparison and the PAS tag comparison detects a mismatch in a given valid cache entry, then that entry is not considered to correspond to the current memory access and if there are no valid entries for which both address tag and PAS tag match in the comparison then the memory access is considered to miss in the GPI cache 22. Note that it is possible to cache multiple entries 190 in the GPI cache 22 relating to the same address tag value 194 but having different PAS tag values 196, so that in cases where the same physical address granule is accessed from multiple PASs then it is still possible to cache granule protection information relating to both PASs.

FIG. 12 illustrates another example for the GPI cache 22, which in this example is combined with the TLB 18 to form a single unified structure. Again, as in FIG. 11, the combined TLB/GPI cache 18, 22 includes entries 200 which have a valid field 192, an address tag field 194, a PAS tag field 196 and a cached information field 198 which for cached GPI entries function in the same way as the corresponding fields 192, 194, 196, 198 described above with respect to FIG. 11. Each entry also includes an entry type field 202 which distinguishes whether a given entry 200 is a GPI entry for which field 198 caches compressed GPI or a TLB entry for which field 198 provides address mapping information. The address tag field 194 is interpreted as a virtual or intermediate address when looked up for TLB information providing address mappings or as a physical address when being looked up as the GPI cache 22 to obtain compressed GPI. It will be appreciated that the binary value stored in the address tag field 194 does not itself distinguish whether it is a virtual address or a physical address, and so this is why the entry type field 202 is provided to distinguish whether entries are virtually addressed TLB entries or physically addressed GPI entries, so that on looking up the combined cache 18, 22 for one of these purposes then the lookup does not hit against the entries allocated for the other purpose. The PAS tag field 196 is either not used for TLB entries providing address mapping information, or could be reused for other purposes (e.g. the PAS tag 196 could be used to store the PAS selection information 126 specified in a corresponding page table entry, which is used to select the selected PAS to be specified for memory access requests hitting against that TLB entry).

While not shown in FIGS. 11 and 12 for conciseness, if the GPT structure supports granule protection descriptors being obtained from higher levels of the table structure other than the bottom level (level 3 in the example of FIG. 9), or if the level 3 descriptor 152 supports different granule sizes (e.g. 4K, 16K or 64K), then each GPI cache entry 190, 200 may also specify a size indicator (set based on the level of the GPT structure at which the corresponding granule protection descriptor was found), which allows the GPI lookup circuitry 21 to determine the size of the granule of physical addresses associated with each bit of the bitmap 182. The size indicator can be used to adjust the size of the portions of the target physical address and the address tag 194 which are compared to identify whether there is a cache hit, and to adjust which bits of the target physical address select the relevant allowed/not-allowed indicator of the compressed GPI bitmap 182.

Figure 13:
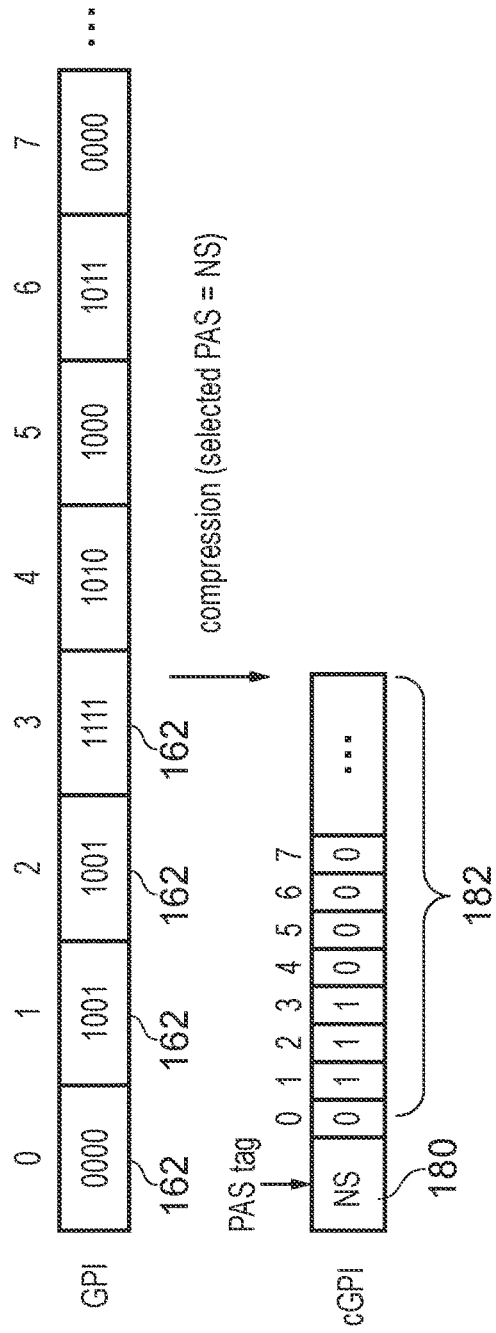
FIG. 13 shows a specific worked example of compressing the granule protection information.

FIG. 13 shows a worked example of GPI compression which is according to the same scheme shown in FIG. 10, which applies a lossy compression to compress the 4-bit GPIs into a bitmap of single-bit indicators 182 indicating whether the PAS identified by the PAS tag 180 is allowed to access each granule. The top part of FIG. 13 illustrates an example of eight GPI indicators 162 encoded in a granule protection descriptor according to the encoding scheme mentioned earlier (the granule protection descriptor may have more than 8 GPI indicators 162, but 8 are shown for conciseness). It is assumed in this case that the GPI is decoded in response to a memory access which specified the non-secure (NS) PAS as the selected PAS and so the GPI is decoded according to the non-secure PAS. Therefore, the PAS tag 180 of the compressed GPI indicates the non-secure PAS, and each bit of the bitmap 182 is set to 1 if the GPI field 162 for the corresponding physical address granule indicated that the granule is allowed to be accessed from the non-secure PAS and otherwise is set to 0. Hence, in this example, bits 1, 2, 3 of the bitmap 182 are set to 1 because the corresponding GPI fields 162 have the encodings 0b1001 and 0b1111 which are the two encodings of GPI in which the non-secure PAS is allowed to provide access to the corresponding physical address granule. Bits 0, 4, 5, 6, 7 of the bitmap 182 are set to 0 because the corresponding GPI fields 162 have other encodings indicating that access is not permitted from the non-secure PAS.

Figure 14:
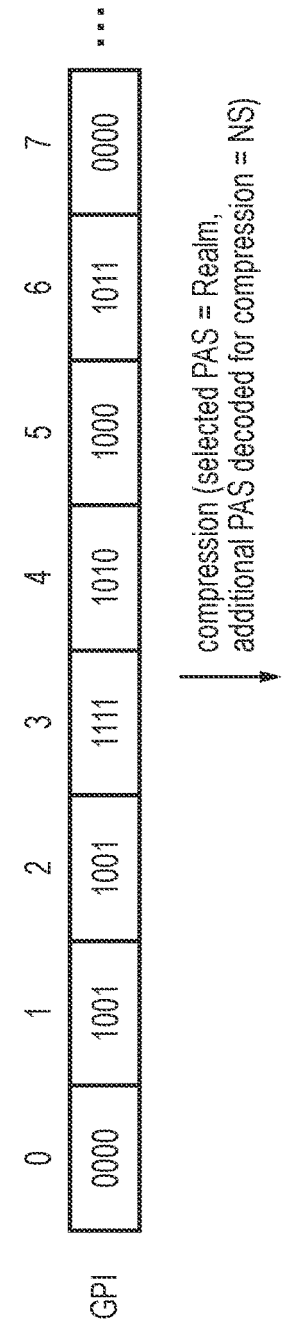
FIG. 14 show a worked example for compressing granule protection information, where the compression scheme supports identifying more than one tagged physical address space for the compressed granule protection information.
Figure 14:
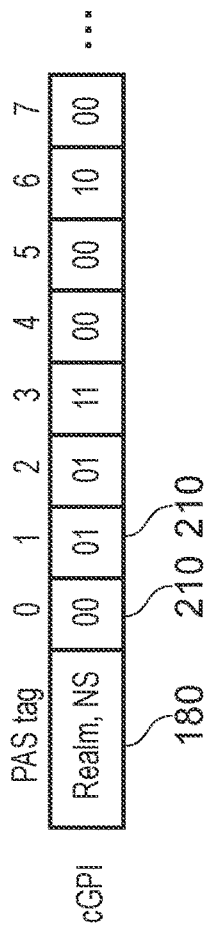

FIG. 14 shows another example of a possible compression scheme which could be used. In this case, the PAS tag 180 is expanded so that it has an encoding identifying two different PASs as tagged PASs and each indicator 210 of the compressed GPI now has an encoding indicating for each of those tagged PASs whether the tagged PASs are allowed to provide access to the corresponding granule of physical addresses. For example, one bit of each 2-bit field could correspond to the first tagged PAS and the second bit could correspond to the second tagged PAS. This approach could allow a single cache entry to provide information about more than one PAS, but still enables compression of the total amount of cached granule protection data compared to the original uncompressed GPIs from the granule protection descriptors loaded from memory. Again, information about at least one of the other PASs not indicated in the PAS tag 180 is lost in the compression.

Alternatively, another way of supporting caching of compressed GPI for multiple PASs corresponding to the same physical address granule could be that, in the scheme shown in FIGS. 10 and 13 where only a single PAS tag is provided, the GPI cache 22 is allocated with two or more different cache entries 190, 200 corresponding to the same address tag 194 but different PAS tags 196.

Figure 15:
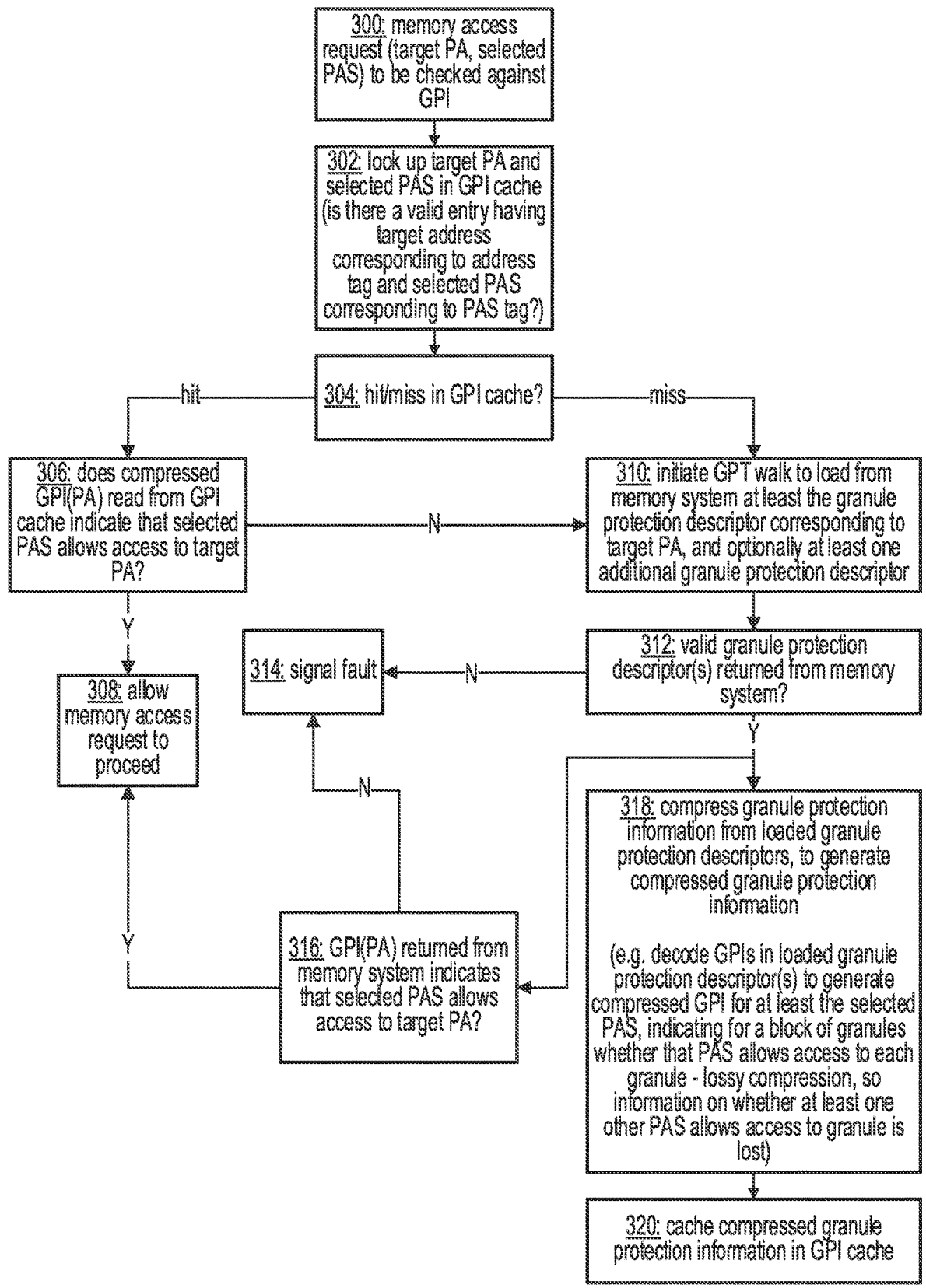
FIG. 15 is a flow diagram illustrating a method for controlling checking, loading and compression of granule protection information.

FIG. 15 is a flow diagram illustrating functions of the PAS filter 20 and associated circuitry 21, 23, 25 for handling access to GPI. At step 300, a memory access request (associated with a target physical address (PA) and a selected PAS) is to be checked against granule protection information by the PAS filter 20. The selected PAS for the memory access request can be selected as shown above in FIG. 8.

At step 302 in response to the memory access request the GPI cache lookup circuitry 21 looks up the target PA and the selected PAS in the GPI cache 22 to determine whether there is a valid entry which has both its address tag 194 corresponding to the target address and its PAS tag 196 corresponding to the selected PAS. In the case of the combined TLB/GPI cache 18, 22 shown in FIG. 12, the lookup may also depend on the entry type 202 of the looked up cache entries, and entries having the entry type 202 indicated as the TLB entry may not be able to return a hit in response to the GPI lookup. The number of cache entries which are looked up by the GPI lookup circuitry 21 will depend on the implemented associativity of the GPI cache 22. The cache arrangement could, for example, be a direct-mapped, set-associative, or fully-associative structure.

At step 304, based on the lookup, the GPI cache lookup circuitry 21 identifies whether the lookup determined a hit or a miss in the GPI cache 18, 22. A hit is detected if there is a valid entry of the cache which has both the address and PAS tags 194, 196 corresponding to the target PA and the selected PAS of the memory access request (and in the case of the combined structure which also has the entry type field 202 indicating a GPI entry). Even if both the address tag 194 and entry type 202 of a valid entry 200 correspond to the target PA and the GPI entry type respectively, a miss will be detected if the PAS tag 196 of that entry does not correspond to the selected PAS, so that the access to the selected PAS cannot accidentally be approved based on compressed GPI which was decoded for a different PAS.

If a hit is detected in the GPI cache then at step 306 the PA filter 20 checks the corresponding GPI indicator for the target PA (e.g. the corresponding bit of the bitmap 182 in FIG. 10 or the corresponding field 210 in FIG. 14). For example, some bits within the target physical address may be used to identify which field of the compressed GPI should be read. The PA filter 20 determines whether the compressed GPI corresponding to the target PA read from the GPI cache 22 indicates that the selected PAS is allowed access to the target physical address, and if so then at step 308 the memory access request is allowed to proceed.

If either the lookup performed at step 302 is determined at step 304 to miss in the GPI cache or on a hit the relevant field of the compressed GPI indicated that the selected PAS is not allowed to provide access to the target PA, then at step 310 the GPI loading circuitry 23 triggers a GPT walk of the GPT structure 56, to load from the memory system 24, 8, 6 at least the granule protection descriptor 152 which corresponds to the target PA. Optionally, the GPI loading circuitry 23 could also load at least one additional granule protection descriptor not relating to the target PA, such as one or more granule protection descriptors for one or more subsequent blocks of physical addresses which follow the target block of physical addresses including the target PA. As memory accesses may be localised then returning some additional granule protection descriptors for nearby blocks of memory can be useful for performance. It can be useful to trigger a GPT walk even if there was a hit in the GPI cache (but the compressed GPI read from the cache for the target PA indicated that access was not allowed), because with the compressed GPI format (e.g. the single bit of 1'b0 to indicate no access for the tagged PA) it may not be possible to distinguish whether the corresponding GPI in the descriptor stored in memory had an invalid encoding or whether the GPI in memory had a valid encoding but did not allow access. In some cases, the type of fault to be generated may be different depending on whether the encoding is invalid or the encoding is valid but prohibited access for the selected PAS. Therefore, rather than faulting directly in response to the hit GPI cache entry indicating no access is allowed, it can be useful to perform the GPT walk at step 310 following a "N" outcome at step 306, so that the cause of the fault can be identified.

At step 312 the GPI loading circuitry 23 determines whether any valid granule protection descriptors have been returned from the memory system in response to the GPT walk 310. One reason why granule protection descriptors returned may not be valid may be that software has not yet configured granule protection descriptors corresponding to the target physical address, and in this case the returned data may be arbitrary other data which may not have a valid granule protection descriptor encoding. Hence, if no valid granule protection descriptor is returned then at step 314 the GPI loading circuitry 23 or the PA filter 20 signals a fault, and this may cause processing on the processing circuitry 10 to be interrupted and an exception handler to deal with the fault. The particular response taken by the handler may depend on the particular software aims of a given system.

If at step 312, valid granule protection descriptors are returned from the memory system then at step 316 the PAS filter 20 uses the returned GPI 162 from the returned granule protection descriptors 152 to perform the PAS check. The PA filter 20 obtains the GPI 162 corresponding to the target physical address and determines whether it indicates that the selected PAS of the memory access request is allowed to provide access to the target PA. If the selected PAS is allowed to provide access to the target PA, then again at step 308 the memory access request is allowed to proceed. If at step 316 the GPI 162 corresponding to the target physical address indicates that the selected PAS is not allowed to access the target PA, then at step 314 a granule protection fault is signalled and again, this may invoke an exception handler within the monitor software 29 to step in and determine how to handle the fault.

Meanwhile, as well as checking the returned GPI, when valid granule protection descriptors are returned from memory at step 312, the method also proceeds to step 318 (which can be performed either in parallel with step 316 or sequentially before or after step 316). At step 318 the GPI compressing circuitry 25 compresses the GPI obtained from the loaded granule protection descriptors to generate compressed GPI. The compression may operate at a granularity of a block multiple granules of physical address space, for example all of the GPIs 162 within one granule protection descriptor 152 or within a group of multiple granule protection descriptors 152 could be compressed as a single action to generate a corresponding compressed GPI entry which can be cached in a single entry of the GPI cache. The compression uses a lossy compression scheme so that information about whether at least one of the PASs is allowed to access to the physical address granule is lost. For example, the GPI compressing circuitry 25 may decode the GPIs 162 in a loaded granule protection descriptor 152 to generate compressed GPI for at least the selected PAS which was specified by the memory access request at step 300 which missed in the GPI cache 304 to trigger the GPT walk, or which otherwise caused the compressed GPI to be generated from the GPI specified by the loaded granule protection descriptor (as shown in the N branch of step 306, it is not only on GPI cache misses that a GPT walk is triggered, as the GPT walk may also be triggered if there is a hit in the GPI cache but the hit GPI cache entry indicates that the selected PAS is not allowed access to the target PA). The compressed GPI generated at step 318 indicates, for a block of multiple PA granules, whether the selected PAS (and optionally other PASs) allows access to each granule, but as the compression scheme is lossy, information on whether at least one other PAS not indicated in the PAS tag 180 of the compressed GPI is lost. At step 320 the compressed GPI generated by the GPI compressing circuitry 25 is cached in a new entry of the GPI cache 22. If necessary, a replacement policy may be used to identify which entry is to be replaced if there is not an invalid entry available.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   address translation circuitry to translate a target virtual address specified by a memory access request into a target physical address associated with a selected physical address space selected from among a plurality of physical address spaces;
   granule protection information loading circuitry to load from a memory system at least one granule protection descriptor providing granule protection information indicating, for at least one granule of physical addresses, which of the plurality of physical address spaces is allowed access to the at least one granule of physical addresses;
   granule protection information compressing circuitry to compress the granule protection information specified by the at least one granule protection descriptor loaded by the granule protection information loading circuitry, to generate compressed granule protection information;
   a granule protection information cache to cache the compressed granule protection information generated by the granule protection information compressing circuitry; and
   filtering circuitry to determine, on a hit in the granule protection information cache for the memory access request, whether the memory access request should be allowed to access the target physical address, based on whether the compressed granule protection information cached in the granule protection information cache for the target physical address indicates that the selected physical address space is allowed access to the target physical address.

2. The apparatus according to claim 1, in which the granule protection information compressing circuitry is configured to compress a block of granule protection information for a plurality of granules of physical addresses, to generate a block of compressed granule protection information for the plurality of granules.

3. The apparatus according to claim 1, in which the granule protection information compressing circuitry is configured to apply a lossy compression scheme to the granule protection information for a given granule of physical addresses, to generate the compressed granule protection information for the given granule of physical addresses, where information lost in the lossy compression scheme is information indicative of whether at least one of the plurality of physical address spaces is allowed access to the given granule of physical addresses.

4. The apparatus according to claim 1, in which the compressed granule protection information associated with a given granule of physical addresses is indicative of which of a proper subset of the plurality of physical address spaces is allowed access to the given granule of physical addresses.

5. The apparatus according to claim 4, in which the proper subset of the plurality of physical address spaces includes the physical address space indicated as the selected physical address space associated with the memory access request which caused the compressed granule protection information to be generated from the granule protection information specified by the at least one granule protection descriptor loaded by the granule protection information loading circuitry.

6. The apparatus according to claim 1, in which the granule protection information cache is configured to store a plurality of granule protection information cache entries each for specifying the compressed granule protection information for a corresponding group of one or more granules of physical addresses, where each granule protection information cache entry is tagged with an address tag indicative of which granules of physical addresses are in the corresponding group, and a physical address space tag indicative of a tagged physical address space.

7. The apparatus according to claim 6, in which the granule protection information cache is configured to support storing two or more separate cache entries having the same address tag but different physical address space tags.

8. The apparatus according to claim 6, in which the compressed granule protection information specified in a given granule protection information cache entry for a given granule of physical addresses is indicative of whether the tagged physical address space indicated by the physical address space tag of the given granule protection information cache entry is allowed access to the given granule of physical addresses.

9. The apparatus according to claim 6, comprising granule protection information cache lookup circuitry to look up the granule protection information cache based on the selected physical address space associated with the memory access request and the target physical address associated with the memory access request.

10. The apparatus according to claim 9, in which the granule protection information cache lookup circuitry is configured to detect a hit in the granule protection information cache for the memory access request when the granule protection information cache includes a valid granule protection information cache entry for which both:
the address tag corresponds to the target address; and
the physical address space tag corresponds to the selected physical address space associated with the memory access request.

11. The apparatus according to claim 9, in which in response to the granule protection information cache lookup circuitry identifying a miss in the granule protection information cache for the target physical address and the selected physical address space: the granule protection information cache lookup circuitry is configured to:
trigger the granule protection information loading circuitry to load from the memory system the at least one granule protection descriptor, including a granule protection descriptor providing the granule protection information for one or more granules of physical addresses, the one or more granules including a target granule of physical addresses including the target physical address;
trigger the granule protection information compressing circuitry to compress the granule protection information loaded by the granule protection information loading circuitry, and allocate at least one new entry to the granule protection information cache specifying at least part of the compressed granule protection information generated by the granule protection information compressing circuitry, where the physical address space tag of the at least one new entry identifies the selected physical address space as the tagged physical address space.

12. The apparatus according to claim 11, in which in response to identifying the miss in the granule protection information cache, the granule protection information cache lookup circuitry is also configured to allocate at least one additional new entry to the granule protection information cache specifying part of the compressed granule protection information generated by the granule protection information compressing circuitry, where the physical address space tag of the at least one additional new entry identifies a physical address space other than the selected physical address space as the tagged physical address space.

13. The apparatus according to claim 1, in which the plurality of physical address spaces include at least three different physical address spaces.

14. The apparatus according to claim 1, comprising physical address space selection circuitry to select the selected physical address space for the memory access request based on at least one of:
a current domain of operation; and
information specified in a page table entry that also provides address mapping information used by the address translation circuitry for translating the target virtual address into the target physical address.

15. The apparatus according to claim 1, comprising processing circuitry to process instructions in one of a plurality of domains of operation, the plurality of domains of operation including at least a non-secure domain, a secure domain, a realm domain and a root domain;
the plurality of physical address spaces comprising:
a root physical address space selectable as the selected physical address space when a current domain of the processing circuitry is the root domain;
a non-secure physical address space selectable as the selected physical address space when the current domain of the processing circuitry is any of the non-secure domain, the secure domain, the realm domain and the root domain;
a secure physical address space selectable as the selected physical address space when the current domain of the processing circuitry is the secure domain or the root domain; and
a realm physical address space selectable as the selected physical address space when the current domain of the processing circuitry is the realm domain or the root domain.

16. The apparatus according to claim 1, comprising a point of physical aliasing (PoPA) memory system component configured to de-alias a plurality of aliasing physical addresses from different physical address spaces which correspond to a same memory system location, to map any of the plurality of aliasing physical addresses to a de-aliased physical address to be provided to at least one downstream memory system component; and
at least one pre-PoPA memory system component provided upstream of the PoPA memory system component, where the at least one pre-PoPA memory system component is configured to treat the aliasing physical addresses from different physical address spaces as if the aliasing physical addresses correspond to different memory system locations.

17. The apparatus according to claim 1, in which the granule protection information cache is a translation lookaside buffer configured to cache both the compressed granule protection information and address mapping information used by the address translation circuitry for translating the target virtual address into the target physical address.

18. The apparatus according to claim 1, comprising a translation lookaside buffer configured to cache address mapping information used by the address translation circuitry for translating the target virtual address into the target physical address, where the translation lookaside buffer is separate from the granule protection information cache.

19. A method comprising:
  translating a target virtual address specified by a memory access request into a target physical address associated with a selected physical address space selected from among a plurality of physical address spaces;
  on a miss in a granule protection information cache for the memory access request:
    loading from a memory system at least one granule protection descriptor providing granule protection information indicating, for at least one granule of physical addresses, which of the plurality of physical address spaces is allowed access to the at least one granule of physical addresses;
    compressing the granule protection information specified by the at least one granule protection descriptor loaded from the memory system, to generate compressed granule protection information; and
    caching the compressed granule protection information in the granule protection information cache; and
  on a hit in the granule protection information cache for the memory access request, determining whether the memory access request should be allowed to access the target physical address, based on whether the compressed granule protection information cached in the granule protection information cache for the target physical address indicates that the selected physical address space is allowed access to the target physical address.

20. A non-transitory computer-readable medium to store computer-readable code for fabrication of an apparatus comprising:
  address translation circuitry to translate a target virtual address specified by a memory access request into a target physical address associated with a selected physical address space selected from among a plurality of physical address spaces;
  granule protection information loading circuitry to load from a memory system at least one granule protection descriptor providing granule protection information indicating, for at least one granule of physical addresses, which of the plurality of physical address spaces is allowed access to the at least one granule of physical addresses;
  granule protection information compressing circuitry to compress the granule protection information specified by the at least one granule protection descriptor loaded by the granule protection information loading circuitry, to generate compressed granule protection information;
  a granule protection information cache to cache the compressed granule protection information generated by the granule protection information compressing circuitry; and
  filtering circuitry to determine, on a hit in the granule protection information cache for the memory access request, whether the memory access request should be allowed to access the target physical address, based on whether the compressed granule protection information cached in the granule protection information cache for the target physical address indicates that the selected physical address space is allowed access to the target physical address.

* * * * *